Aug. 24, 1948.  A. SONNTAG  2,447,778
MULTILOAD RANGE WEIGHING SYSTEM FOR
MATERIALS TESTING MACHINES
Original Filed June 19, 1945  2 Sheets-Sheet 1
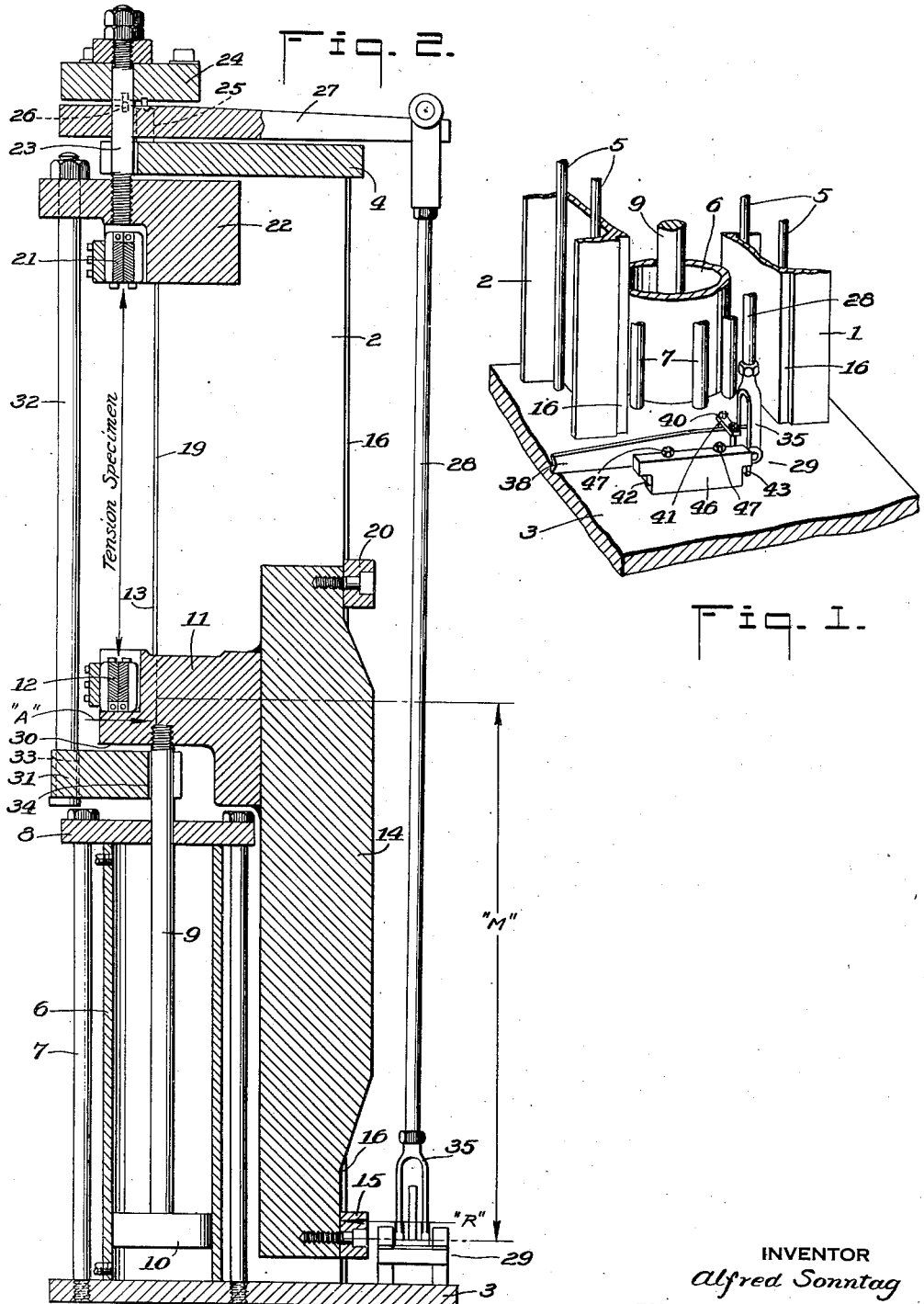
INVENTOR
Alfred Sonntag
BY
ATTORNEY Aug. 24, 1948.  A. SONNTAG  2,447,778
MULTILOAD RANGE WEIGHING SYSTEM FOR
MATERIALS TESTING MACHINES
Original Filed June 19, 1945  2 Sheets-Sheet 2

INVENTOR
Alfred Sonntag
BY
ATTORNEY

Patented Aug. 24, 1948

2,447,778

UNITED STATES PATENT OFFICE 2,447,778

MULTILOAD RANGE WEIGHING SYSTEM FOR MATERIALS TESTING MACHINES

Alfred Sonntag, Greenwich, Conn., assignor, by mesne assignments, to The Baldwin Locomotive Works, a corporation of Pennsylvania Original application June 19, 1945, Serial No. 600,320. Divided and this application November 9, 1946, Serial No. 708,982

2 Claims. (Cl. 73—95)

This invention relates generally to a load weighing apparatus and more particularly to an improved multi-load range weighing apparatus and system for materials testing machines. This application is a division of my co-pending application Serial No. 600,320, filed June 19, 1945.

An object of my invention is to provide an improved multi-load range weighing apparatus and system whereby a plurality of load weighing ranges may be obtained in a simple, direct and highly expeditious manner. In accomplishing this object I have provided, in one aspect of the invention, a plurality of stationary knife edge seats and then employ a similar number of greater spaced knife edges on a weighing beam which is shiftable in a simple manner to bring one or the other of the knife edges into cooperation with a selected seat, thereby changing the load weighing ratios.

Other objects and advantages will be more apparent to those skilled in the art from the following description of the accompanying drawings in which:

Fig. 1 is a perspective of my multi-load range weighing apparatus and system, showing it in position at the rear of a materials testing machine of the type which is the subject of my said co-pending application;

Fig. 2 is a vertical side section through the center of said testing machine, the front of the machine being to the left;

Figure 4:
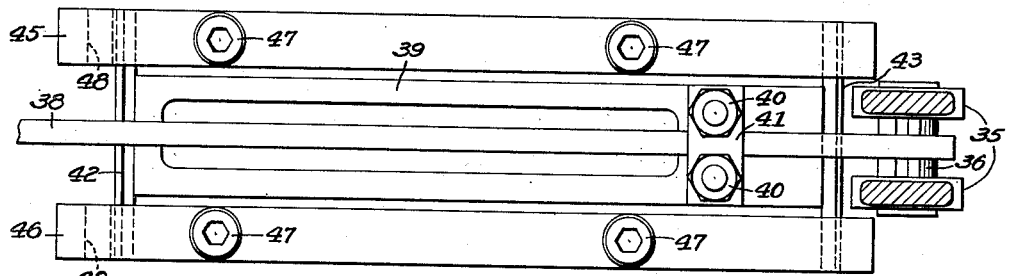
Fig. 4 is a plan view of Fig. 3.
Figure 3:
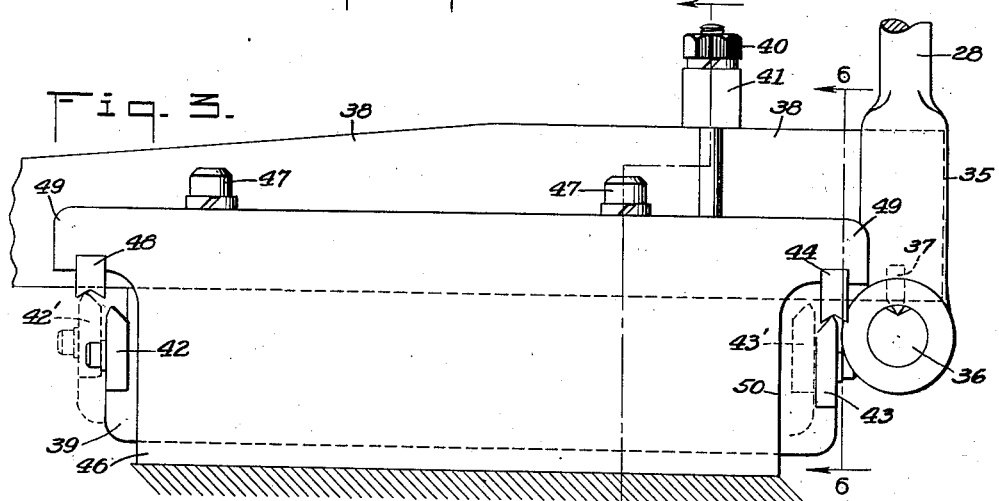
Fig. 3 is a fragmentary side elevation of the shiftable lever knife edge system.
Figures 5, 6, 7:
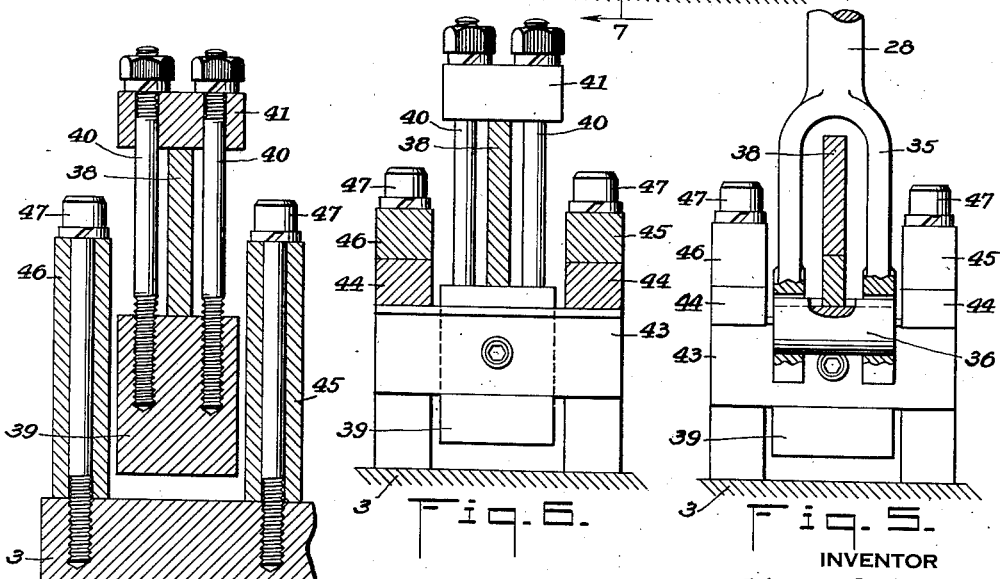
Fig. 5 is a view taken from the right end of Fig. 3 with parts broken away to show details of construction.

Figs. 6 and 7 are transverse sections taken respectively substantially on the lines 6—6 and 7—6 of Fig. 3.

In the particular embodiment of the invention as disclosed herein merely for the purpose of illustration, I have shown my improved multi-load weighing apparatus and system applied to the type of materials testing machine which is the subject of my said co-pending application, although it should be understood that the multi-load weighing apparatus and system may be effectively applied to other types of testing machines or devices. The testing machine disclosed in my said co-pending application consists of two structural side channels 1 and 2, Fig. 1, with their backs facing each other and extending vertically from and secured to a base plate 3. An upper plate 4, Fig. 2, is seated upon and connects the upper ends of the side channels while a series of tie bolts 5, Fig. 1, hold these elements rigidly together which, if desired, may be supplemented by welding at any desired joints.

A hydraulic loading mechanism includes a cylinder 6 clamped to the base by a series of rods 7 extending through a plate type cylinder head 8 which may be provided with suitable packing (not shown) for a piston rod 9 actuated by a piston 10. Fluid pressure from any suitable source (not shown) is supplied to the top side of piston 10 (the lower side then being open to exhaust) to transmit a loading force to a loading head 11 which is vertically movable. The head contains a lower set of tension grips 12 disposed at the forward side thereof in a plane well in advance of the front edge 13 of the side channels thereby providing maximum accessibility to the grips and specimen although involving an offset or eccentric relation of the loading ram with respect to the position of the specimen axis relative to the loading head 11. However, this is overcome in an effective manner by securing the loading head 11, through welding or bolts, to a relatively long vertical moment arm 14, which is adapted to extend in overlapping relation to substantially the full length of cylinder 6 when the head is in its lowermost position. The lower end of arm 14, Fig. 2, is a relatively narrow but deep member to which is removably secured at its lowermost end a cross guide 15. This guide slides on two recessed vertical guideways 16, machined in the flanges of channels 1 and 2. The lateral edges of head 11 are slidable on a pair of vertical guideways 19, Fig. 2, machined in the front flanges of the channels. A nominal retainer bar 20 may be secured to the upper end of arm 14 and slidable in the rear grooves 16.

A specimen (not thown), whose position or longitudinal axis is indicated by a line with the legend "Tension specimen" in Fig. 2, has its upper end secured in a pair of grips 21 disposed in a sensitive weighing head 22, this head and the platen 11 constituting opposed specimen engaging members. The head 22 is supported through a rod 23, coaxial with the specimen axis, to a lever 24 supported on laterally disposed knife edges 25 and stationary rests. The head 22 also has knife edge contact 26 with a lever 27 which in turn is connected through a knife edge to a vertical link 28 extending down to my improved multi-load range shifting mechanism, generally indicated at 29 to be described later.

In operation, the platen 11 may be raised to any desired position depending upon the length of specimen by supplying fluid to the underside of piston 10 and exhausting fluid from the upper side thereof whereas, during loading, fluid is supplied to the upper side of piston 10 and exhausted on the lower side thereof for either tension or compression testing. In either case the loading force on platen 11 to the specimen tends to cause eccentric forces to be created in the platen and loading mechanism but this is counteracted by reason of front guides exerting a force to the right, as indicated by arrow A, Fig. 2, whereas guides 15 exert a force to the left as indicated by arrow R respectively constituting action and reaction forces which are maintained relatively small by reason of the relatively long moment arm represented approximately by the distance M, Fig. 2.

Compression specimens are placed between the lower side 30 of head 11 and a platen 31 which is secured by a pair of rods 32 to the weighing head 22, Fig. 2. Hence, during downward compression testing the load to be weighed is transmitted to head 22 which then functions in identically the same manner as during the tension test. The platen or table 31 may be notched as at 33 to receive the rods 32, and can also be notched as at 34 to allow piston rod 9 to extend freely upwardly.

In my multi-load weighing system the link 28, Figs. 1, 2, 3 and 5, terminates at its lower end in a clevice 35 provided with a knife edge pin type support 36 bearing upwardly against a knife edge 37 which is secured in a longitudinally shiftable lever 38. This lever as shown in Fig. 5 lies within the clevice 35 and as shown in Fig. 3 extends any desired distance to the left for ultimate connection to a load weighing or indicating device of any usual and well-known type involving either springs or a pendulum. Inasmuch as such devices are well-known in the art they need not be shown or described herein due to the fact that my particular improvement resides in the mechanism for selecting the load range. To this end the lever 38 has a dependent extension 39 clamped to the lever by a pair of bolts 40 and cross piece 41, the lower end of the bolts being preferably threaded into the member 39, as shown in Fig. 7. The member 39 has a plurality of knife edges 42 and 43 which, Fig. 6, extend laterally to engage knife edge supports 44, 44, respectfully secured to a pair of parallel stationary sides 45 and 46. These sides are held in position on base 3, Figs. 3 and 7, by a pair of screws on one side and a similar pair of screws 47 on the other side. The other end of the stationary elements 45 and 46 have a pair of transversely aligned knife edge supports 48. The knife edge supports 44 and 48 are mounted in overhanging ends such as 49 and are spaced apart a greater distance than the knife edges 42 and 43 with the result that only one knife edge is in engagement with its support at a given time. For example, knife edge 43, Fig. 3, is resting against knife edge support 44 while knife edge 42 is entirely free of support 48. In this position the load weighing ratio involves a lever arm equal only to the distance between the knife edges 37 and 43. To provide a different ratio, the operator grasps link 28 and pulls downwardly thereon to completely free knife edge 43 from its support 44 and then shifts link 28, together with lever 38, to the left until the laterally extending wings of knife edge 44 substantially abut against the vertical surface 50 of the stationary side plates 45 and 46. This position of knife edge 43 is shown at 43', Fig. 3, and at this time knife edge 42 is substantially in the position shown in dotted lines at 42'. When link 28 is released and allowed to move upwardly, which will occur by reason of the weight of heads 22 and platen 31 and their connected parts, the knife edge 42 will engage supports 48 whereupon the weighing system involves a multiplying lever arm equal to the distance between knife edges 37 and 42. When the knife edge 42 is seated the extending wings of knife edge 43 will move slightly away from edge 50, Fig. 3, so as to allow complete pivotal freedom of lever 38 about knife edge supports 48. The multiple pivotal points are compactly arranged and are adapted to be supported directly upon base plate 3, as shown in Fig. 2. It is also apparent that the knife edges and their supports may be revised.

It is thus seen that an extremely simple, rugged and easily shiftable multi-load range weighing system has been provided.

It will of course be understood that various changes in details of construction and arrangement of parts may be made by those skilled in the art without departing from the spirit of the invention as set forth in the appended claims.

I claim:

1. A materials testing machine comprising, in combination, a pair of opposed specimen engaging members, load producing mechanism connected to one of said specimen engaging members for loading a specimen, and a multi-load range weighing system connected to the other specimen engaging member including a weighing lever, a set of knife edges spaced apart lengthwise of said lever and a set of knife edge supports spaced apart lengthwise of said lever, one of said sets being connected to said lever for movement therewith and the other set being mounted in a relatively fixed position, and said knife edge supports being spaced apart a different distance than said knife edges whereby relative movement between said lever and supports in a direction lengthwise of the lever allows one or the other of said knife edges to be selectively positioned against a knife edge support thereby to provide different load ranges.

2. The combination set forth in claim 1 further characterized in that a weighing link is operatively connected to said other specimen engaging member and extends vertically downward for pivotal engagement with said lever, and said knife edges are arranged to exert an upward force against their supports whereby in order to render one or the other of said knife edges operative the link is moved downwardly and then shifted laterally.

ALFRED SONNTAG.

REFERENCES CITED

The following references are of record in the file of this patent:

UNITED STATES PATENTS

| Number | Name | Date |
| --- | --- | --- |
| 150,115 | Weston et al. | Apr. 21, 1874 |
| 217,734 | Olsen | Feb. 25, 1879 |
| 875,730 | Olsen | June 7, 1908 |
| 1,758,036 | Hallwood | May 13, 1930 |
| 1,798,949 | Moran | Mar. 31, 1931 |
| 2,055,787 | Dinzl | Sept. 29, 1936 |

FOREIGN PATENTS

| Number | Country | Date |
| --- | --- | --- |
| 16,763 | Great Britain | 1886 |